United States Patent
Seo et al.

(10) Patent No.: US 9,781,002 B2
(45) Date of Patent: Oct. 3, 2017

(54) MEASURING METHOD AND APPARATUS IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 671 days.

(21) Appl. No.: 14/364,069

(22) PCT Filed: Dec. 18, 2012

(86) PCT No.: PCT/KR2012/011054
§ 371 (c)(1),
(2) Date: Jun. 9, 2014

(87) PCT Pub. No.: WO2013/094958
PCT Pub. Date: Jun. 27, 2013

(65) Prior Publication Data
US 2014/0313925 A1 Oct. 23, 2014

Related U.S. Application Data

(60) Provisional application No. 61/577,655, filed on Dec. 19, 2011.

(51) Int. Cl.
*H04L 12/24* (2006.01)
*H04L 1/00* (2006.01)
(Continued)

(52) U.S. Cl.
CPC ....... *H04L 41/0816* (2013.01); *H04B 17/345* (2015.01); *H04L 41/0823* (2013.01);
(Continued)

(58) Field of Classification Search
CPC .. H04B 17/382; H04B 17/345; H04B 7/2656; H04L 41/0816; H04L 1/0072;
(Continued)

(56) References Cited

U.S. PATENT DOCUMENTS

2009/0249153 A1* 10/2009 Zhang .................. H04L 1/1887
714/748
2010/0220597 A1* 9/2010 Ji ........................ H04W 16/10
370/241
(Continued)

FOREIGN PATENT DOCUMENTS

| CN | 101431362 | 5/2009 |
| CN | 102064879 | 5/2011 |

(Continued)

OTHER PUBLICATIONS

The State Intellectual Property Office of the People's Republic of China Application No. 201280062919.2, Office Action dated May 3, 2016, 18 pages.
(Continued)

*Primary Examiner* — Yee Lam
(74) *Attorney, Agent, or Firm* — Lee Hong Degerman Kang Waimey

(57) ABSTRACT

An embodiment of the present invention relates to a method for transmitting information for measuring a terminal by a first transmission point among a plurality of transmission points which use identical time division duplex (TDD) settings in a wireless communication system. The method is an information transmitting method and includes a step of transmitting a subframe set for measurement to the terminal, wherein the subframe set is determined from first and second pieces of information related to a change of the TDD setting.

10 Claims, 9 Drawing Sheets

(51) Int. Cl.
*H04W 24/02* (2009.01)
*H04B 17/345* (2015.01)
*H04B 17/382* (2015.01)

(52) U.S. Cl.
CPC .......... *H04W 24/02* (2013.01); *H04B 17/382* (2015.01); *H04L 1/0072* (2013.01)

(58) Field of Classification Search
CPC .. H04L 41/0823; H04L 5/1484; H04W 24/02; H04W 72/082; H04W 16/14; H04W 72/12
See application file for complete search history.

(56) References Cited

U.S. PATENT DOCUMENTS

2011/0267994 A1 11/2011 Pan et al.
2012/0236736 A1* 9/2012 Frank .................... H04W 24/04
  370/252
2013/0121189 A1* 5/2013 Bhattad ............... H04W 72/082
  370/252

FOREIGN PATENT DOCUMENTS

| CN | 102281099 | 12/2011 |
| JP | 2006-352859 | 12/2006 |
| KR | 10-2009-0032628 | 4/2009 |
| KR | 10-1015473 | 2/2011 |
| KR | 10-1089003 | 12/2011 |

OTHER PUBLICATIONS

PCT International Application No. PCT/KR2012/011054, Written Opinion of the International Searching Authority dated Mar. 29, 2013, 16 pages.

* cited by examiner

FIG. 5
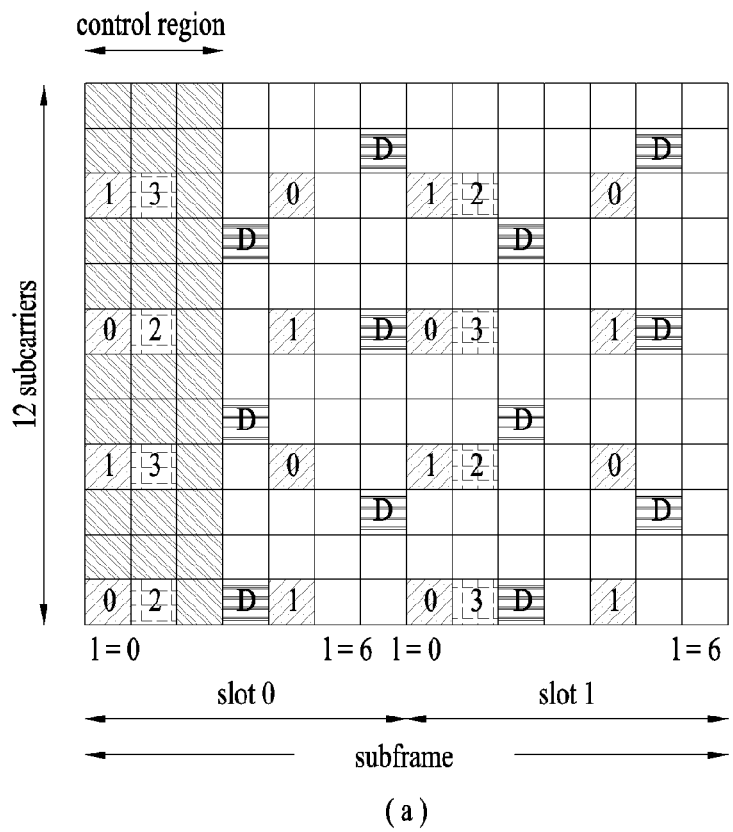
(a)
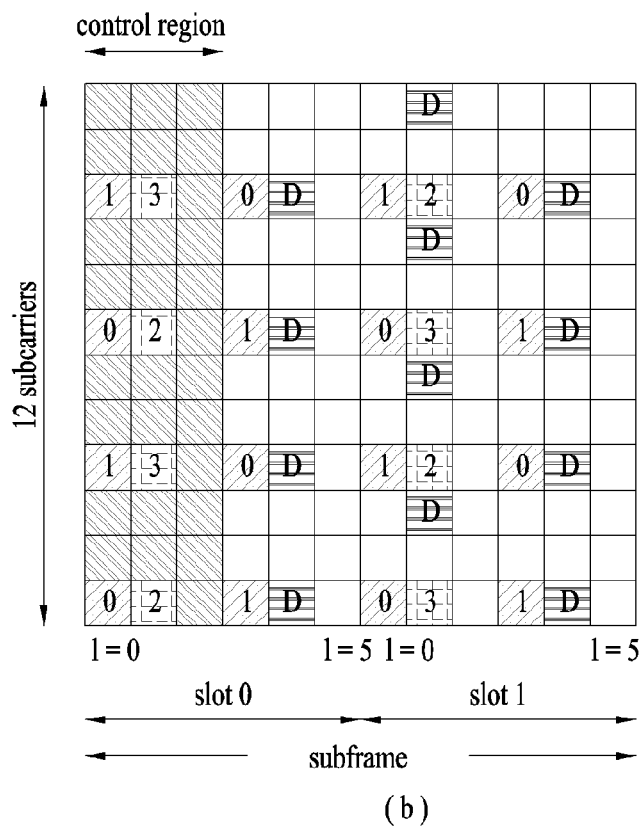
(b)

FIG. 8
(a) 
(b) 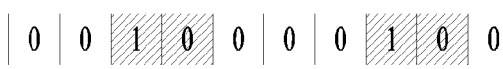
(c) 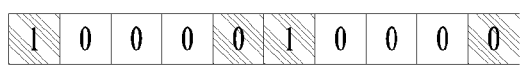
(d) 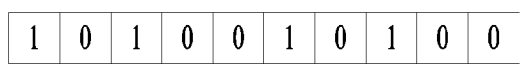
(e) 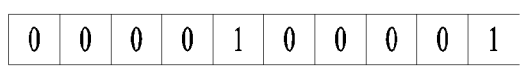

MEASURING METHOD AND APPARATUS IN WIRELESS COMMUNICATION SYSTEM

CROSS-REFERENCE TO RELATED APPLICATIONS

This application is the National Stage filing under 35 U.S.C. 371 of International Application No. PCT/KR2012/011054, filed on Dec. 18, 2012, which claims the benefit of U.S. Provisional Application Ser. No. 61/577,655, filed on Dec. 19, 2011, the contents of which are all hereby incorporated by reference herein in their entirety.

TECHNICAL FIELD

The present invention relates to a wireless communication system, and more particularly to a method and apparatus for transmitting a subframe set for measurement.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide technologies associated with a subframe set for measurement in an interference environment changed when a Time Division Duplex (TDD) configuration is changed.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting information of user equipment (UE) measurement by a first transmission Point from among a plurality of TPs configured to use the same Time Division Duplex (TDD) configuration in a wireless communication system including: transmitting a subframe set for measurement to a user equipment (UE), wherein the subframe set is decided on the basis of first information and second information associated with a change of the TDD configuration.

In a second technical aspect of the present invention, a first TP apparatus for transmitting information of user equipment (UE) measurement from among TPs configured to use the same Time Division Duplex (TDD) configuration in a wireless communication system includes: a transmission (Tx) module; and a processor, wherein the processor transmits a subframe set for measurement to a user equipment (UE), wherein the subframe set is decided on the basis of first information and second information associated with a change of the TDD configuration.

In a third technical aspect of the present invention, a method for measuring at least one of a plurality of TPs configured to use the same Time Division Duplex (TDD) configuration in a wireless communication system includes: receiving a subframe set for measurement from a first TP including a user equipment (UE); and performing measurement in at least one subframe corresponding to the subframe set, wherein the subframe set is decided on the basis of first information and second information associated with a change of the TDD configuration.

In a fourth technical aspect of the present invention, a user equipment (UE) apparatus for measuring at least one of a plurality of TPs configured to use the same Time Division Duplex (TDD) configuration in a wireless communication system includes: a reception (Rx) module; and a processor, wherein the processor receives a subframe set for measurement from a first TP including a user equipment (UE), and performs measurement in at least one subframe corresponding to the subframe set, wherein the subframe set is decided on the basis of first information and second information associated with a change of the TDD configuration.

The first to fourth technical aspects may include all or some parts of the following items.

The first information may be specific information changed when a uplink subframe according to the TDD configuration is to be used for downlink by the first TP, and the second information may be specific information changed when a downlink subframe according to the TDD configuration is to be used for uplink by the second TP neighboring with the first TP.

The subframe set may be decided by a logical OR operation between the first information and the second information.

The subframe set may be needed for the user equipment (UE) configured to measure interference caused by a change of the TDD configuration.

The second information may be transferred from a second TP neighboring with the first TP to the first TP.

The method may further include: transmitting a subframe set composed of information regarding some subframes configured for downlink transmission from among subframes not contained in the subframe set.

The first to fourth technical aspects may include all or some parts of the following items.

The first information may be specific information changed when a uplink subframe from among the TDD configuration is to be used for downlink by the first TP, and the second information may be specific information changed when a subframe for downlink from among the TDD configuration is to be used for uplink by the second TP neighboring with the first TP.

The subframe set may be decided by a logical OR operation between the first information and the second information.

The subframe set may be configured to measure interference caused by a change of the TDD configuration, and the measurement step may further include averaging interference measured in the at least one subframe.

The second information may be transferred from a second TP neighboring with the first TP to the first TP.

Advantageous Effects

As is apparent from the above description, the user equipment (UE) according to the embodiments of the present invention can perform correct measurement although an interference environment is changed due to the change of TDD configuration.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a reference signal (RS).

FIG. 8 is a conceptual diagram illustrating a method for generating a subframe set according to the embodiments of the present invention.

BEST MODE

Figure 1:
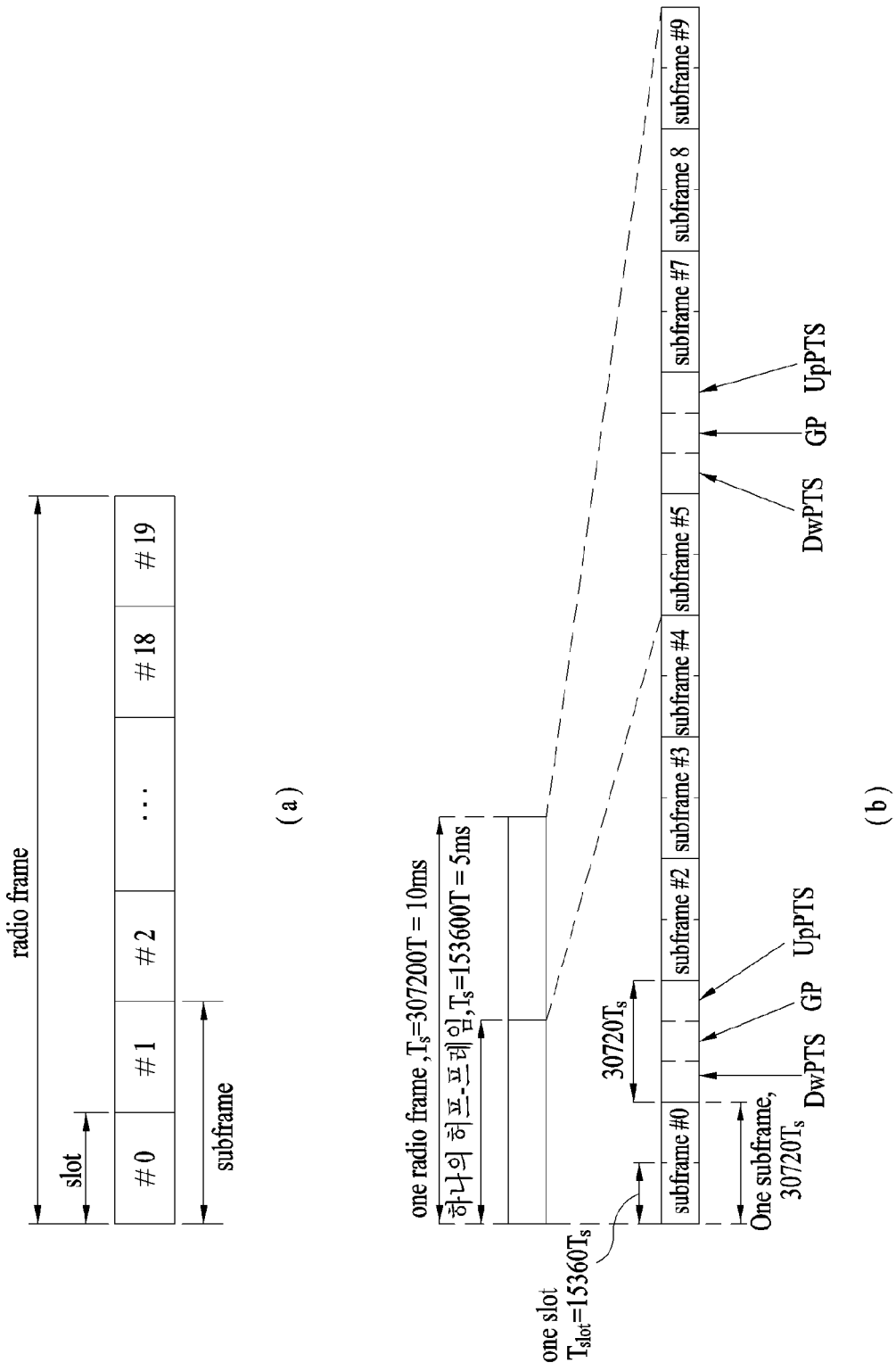
FIG. 1 exemplarily shows a downlink radio frame structure.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
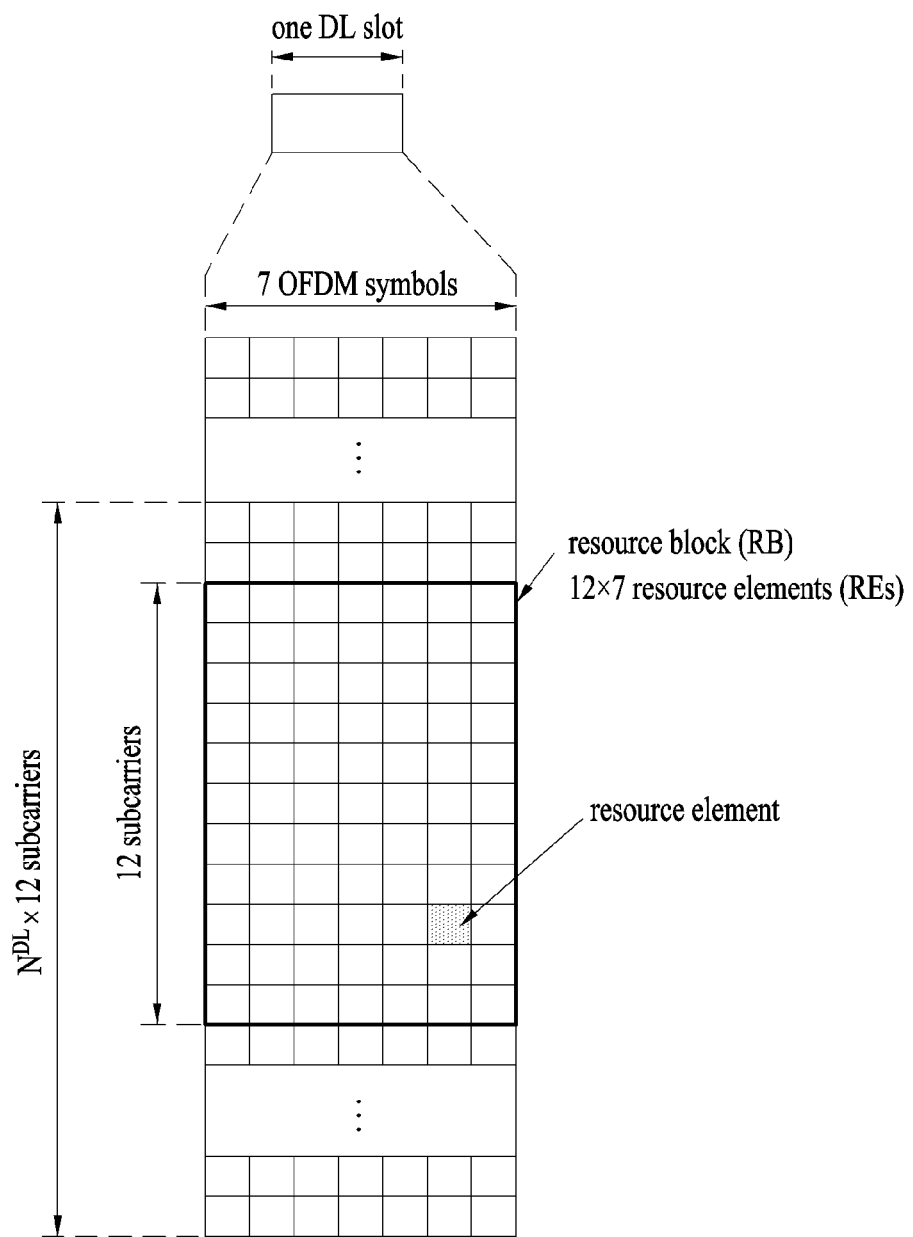
FIG. 2 exemplarily shows a resource grid of one downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
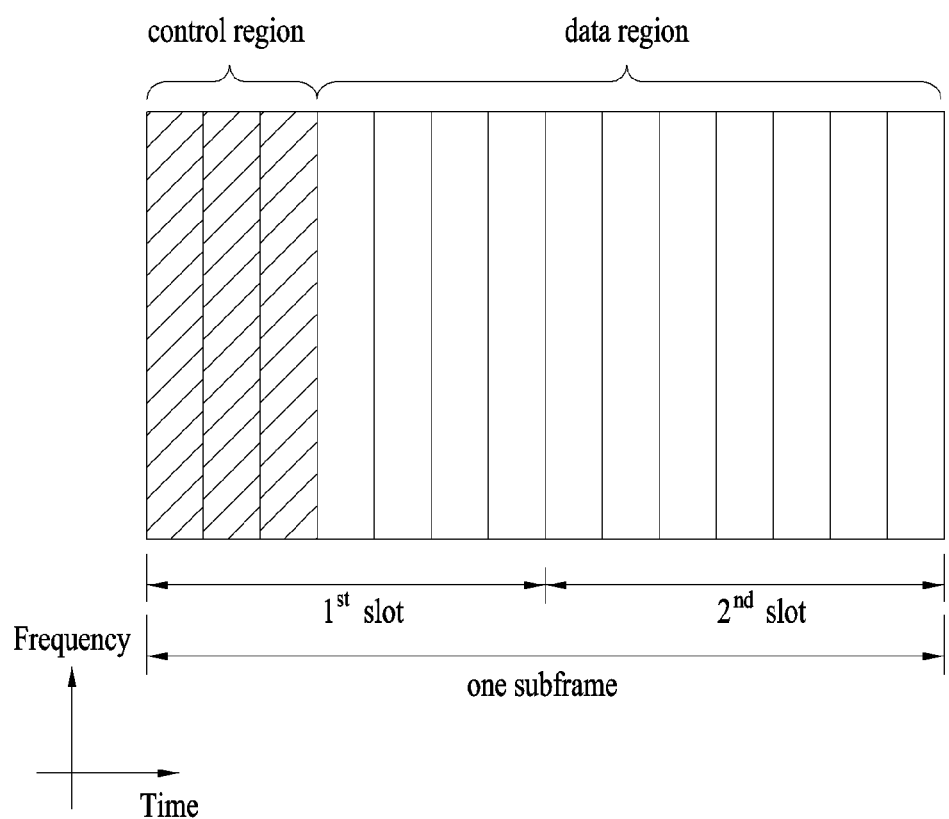
FIG. 3 exemplarily shows a downlink subframe structure.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
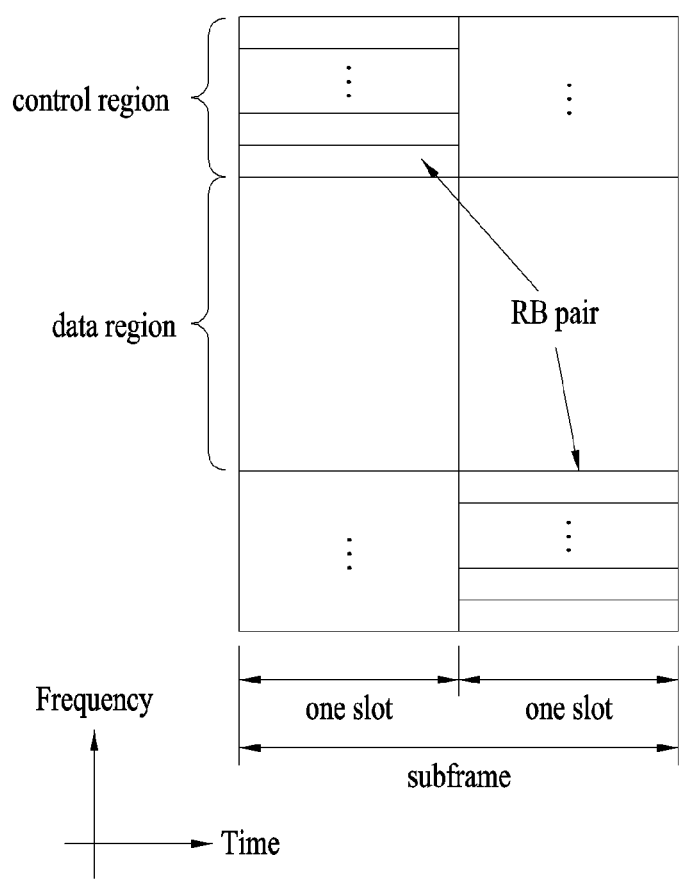
FIG. 4 exemplarily shows an uplink subframe structure.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. The signal is referred to as a pilot signal or a reference signal.

If data is transmitted and received using multiple antennas, a channel state between each transmission antenna and each reception antenna should be known in order to accurately receive a signal. Accordingly, a reference signal is present per transmission antenna and, more particularly, per antenna port.

The reference signal may be divided into an uplink reference signal and a downlink reference signal. In a current LTE system, the uplink reference signal includes:

i) a demodulation reference signal (DM-RS) for channel estimation for coherent demodulation of information transmitted via a PUSCH and a PUCCH, and ii) a sounding reference signal (SRS) for measuring uplink channel quality of a network at different frequencies at the BS.

The downlink reference signal includes:

i) a cell-specific reference signal (CRS) shared by all UEs in the cell, ii) a UE-specific reference signal for a specific UE, iii) a demodulation-reference signal (DM-RS) transmitted for coherent demodulation if a PDSCH is transmitted, iv) a channel state information-reference signal (CSI-RS) for delivering channel state information (CSI) if a downlink DMRS is transmitted, v) an MBSFN reference signal transmitted for coherent demodulation of a signal transmitted in a multimedia broadcast single frequency network (MBSFN) mode, and vi) a positioning reference signal used to estimate geographical position information of the UE.

The reference signals may be broadly divided into two reference signals according to the purpose thereof. There are a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation. The CRS is transmitted per subframe over a wide band and reference signals for a maximum of four antenna ports are transmitted according to the number of transmit antennas of the base station.

For example, if the number of transmit antennas of the base station is 2, CRSs for antenna ports 0 and 1 are transmitted and, if the number of transmit antennas of the base station is 4, CRSs for antenna ports 0 to 3 are transmitted.

FIG. 5 is a diagram illustrating a pattern in which CRSs and DRSs defined in a legacy 3GPP LTE system (e.g., release-8) are mapped onto resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 5($a$)) and 12 OFDM symbols in case of an extended CP (FIG. 5($b$)).

FIG. 5 shows locations of the reference signals on the RB pairs in a system in which the base station supports four transmit antennas. In FIG. 5, resource elements (REs) denoted by "0", "1", "2" and "3" represent the locations of the CRSs for antenna port indices 0, 1, 2 and 3. Meanwhile, the RE denoted by "D" represents the location of the DMRS.

Measurement/Measurement Report

A measurement report is used for many techniques designed to ensure the mobility of UEs (handover, random access, cell search, etc.) or for one of the techniques. Since the measurement report requires a certain degree of coherent demodulation, a UE may perform measurement after acquiring synchronization and physical layer parameters, except for measurement of a received signal strength. The measurement report conceptually covers Radio Resource Management (RRM) measurement of measuring the signal strengths or signal strengths to total reception power of a serving cell and neighbor cells, including Reference Signal Received Power (RSRP), Received Signal Strength Indicator (RSSI), and Reference Signal Received Quality (RSRQ), and Radio Link Monitoring (RLM) measurement of measuring link quality with respect to the serving cell to thereby determine whether a radio link has failed.

RSRP is defined as the linear average over the power contributions of REs that carry downlink CRSs.

RSSI is defined as the linear average of the total received power of a UE. The RSSI is measured from OFDM symbols carrying RSs for antenna port 0, including interference and noise power from neighbor cells. If a specific subframe is indicated for RSRQ measurement by higher-layer signaling, the RSSI is measured over all OFDM symbols of the indicated subframe.

RSRQ is defined as (N×RSRP/RSSI), where N is the number of RBs over the measurement bandwidth of RSSI.

Basically, measurement reporting is performed using CRS. In an embodiment of the present invention, measurement reporting may be performed using one or a selective combination of CRS, CSI-RS, and DMRS. In addition, the measurement reporting may also be performed with respect to a specific antenna port(s) from among antenna ports through which RSs are transmitted or with respect to a specific RS configuration (e.g., a plurality of CSI-RS configurations may be allocated to the same subframe, and each CSI-RS configuration may include CSI-RSs for 2, 4, or 8 ports which may be transmitted at different time points).

Transmission or non-transmission of a measurement report can be determined by the following event-based measurement report decisions i) to v).

i) In Decision i), a measurement value of the serving cell is higher than an absolute threshold value (i.e., Serving cell becomes better than absolute threshold).

ii) In Decision ii), a measurement value of the serving cell is lower than an absolute threshold value (i.e., Serving cell becomes worse than absolute threshold).

iii) In Decision iii), a measurement value of a neighboring cell is higher than a measurement value of the serving cell by an offset value (i.e., Neighboring cell becomes better than an offset relative to the serving cell).

iv) In Decision iv), a measurement value of a neighboring cell is higher than an absolute threshold value (i.e., Neighboring cell becomes better than absolute threshold).

v) In Decision v), a measurement value of the serving cell is lower than an absolute threshold value, and a measurement value of the neighboring cell is higher than another absolute threshold value (i.e., Serving cell becomes worse than one absolute threshold and Neighboring cell becomes better than another absolute threshold).

In Decision (i)~(v), the measurement value may be an RSRP, etc.

Measurement reporting may be transmitted only when individual conditions for the above-mentioned decisions are maintained for a predetermined time or longer configured in a network.

The above-mentioned TDD will hereinafter be described with reference to FIG. 1. Each subframe (other than a special subframe for UL-to-DL switching) of Type-1 radio frame of TDD for use in LTE/LTE-A may be pre-configured to be used for any one of UL and DL. In more detail, as can be seen from Table 1 showing UL-to-DL configuration #0, subframes #0 and #5 of a single radio frame may be pre-configured in such a manner that subframes #2, #3, #4, #7, #8, #9 may be used for uplink.

UL-to-DL configuration to be used by a certain specific Transmission Point (TP) may be provided as a part of system information to a user equipment (UE). Neighbor TPs may be forced to use the same TDD configuration (i.e., UL-to-DL configuration) due to the reason of interference or the like.

TABLE 1

| Uplink-to-downlink configuration | Downlink-to-Uplink switch-point periodicity | Subframe Number | | | | | | | | |
|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |

(D: Subframe for DL transmission, U: Subframe for UL transmission, S: Special subframe)

If the amount of data transmitted on downlink or uplink rapidly increases in each cell even when the system operates according to UL-to-DL configuration (hereinafter referred to as UL-DL configuration), one or more subframes configured in uplink are changed to others for downlink so as to implement smooth transmission of data. Alternatively, it is necessary for one or more subframes configured in downlink to be changed to others for uplink. In this case, unexpected problems may occur by interference encountered in the relationship between neighbor TPs configured to use the same TDD configuration, and a detailed description thereof will hereinafter be described with reference to FIG. 6.

Figure 6:
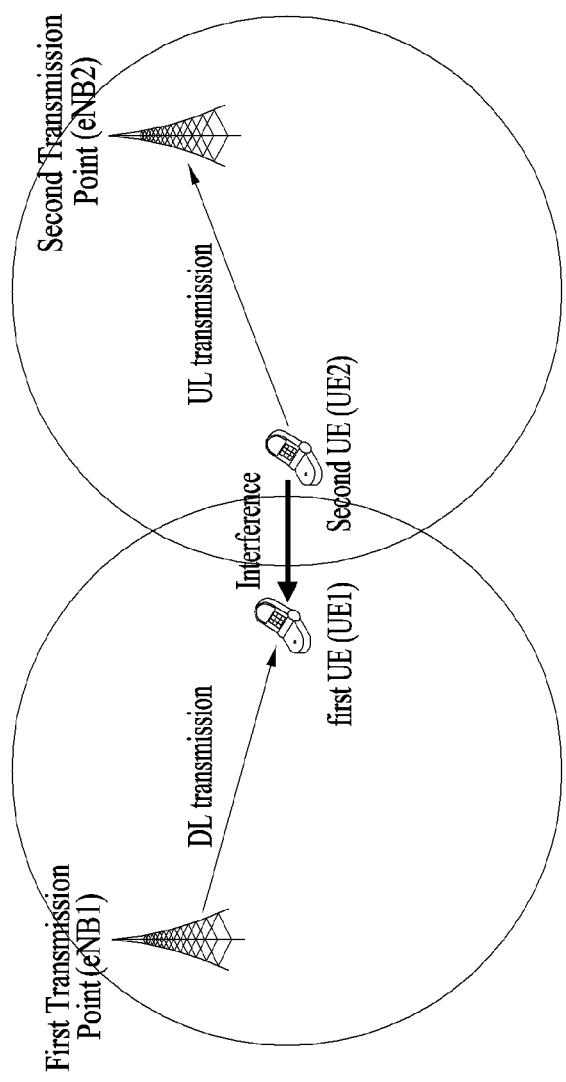
FIG. 6 is a conceptual diagram illustrating an interference change caused by a change of TDD configuration.

FIG. 6 shows measurement interference that may occur when a TDD configuration is changed in a certain TP by a UE contained in any one of TPs from among neighbor TPs configured to use the same TDD configuration.

FIG. 6 shows a first TP (eNB1), a second TP (eNB2) neighboring with the first TP (eNB1), a first UE (UE1) contained in eNB1, and a second UE (UE2) contained in eNB2. In FIG. 6, it is assumed that the first TP (eNB1) and the second TP (eNB2) use the same TDD configuration. Under this situation, if at least one subframe configured for UL transmission from among a TDD configuration is changed to be used for DL transmission by the first TP (eNB1), UE1 located at a cell edge of the first TP (eNB1) may receive interference by UL transmission of the second UE (UE1) within the corresponding subframe. In other words, UL transmission of the second UE (UE2) may apply strong interference to DL reception of the first UE (UE1). In addition, other UEs (not shown) contained in the first TP (eNB1) may experience interference having characteristics different from those of a subframe in which the first TP (eNB1) and the second TP (eNB2) operate in the same TDD configuration.

Individual UEs may measure interference for CSI or RRM measurement, and this interference may be calculated as an average value of measurement values measured in several subframes. However, if TDD configuration is changed in a certain TP as described above, if measurement values of subframes under the condition that TDD configuration remains unchanged and measurement values of other subframes under the condition that TDD configuration is changed are averaged, there is a high possibility of generating unexpected problems in measurement accuracy.

For example, if interference obtained when interference measured in a subframe of a predetermined time is averaged and calculated is used for CSI measurement, CSI reported by the first UE (UE1) of FIG. 6 is underestimated as compared to an actual channel, and a Modulation and Coding Scheme (MCS) lower than an available MCS of an actual channel is reported, resulting in reduction of throughput. CSI of a subframe in which TDD configuration is changed is overestimated as compared to the actual channel, resulting in an increased block error rate.

Therefore, the present invention proposes a method for signaling a subframe pattern in which a TDD configuration is changed between TPs, and a method for identifying a subframe set through which the UE measures CSI or RRM on the basis of the corresponding pattern. Detailed methods of the above-mentioned proposed method will hereinafter be described in detail.

Figure 7:
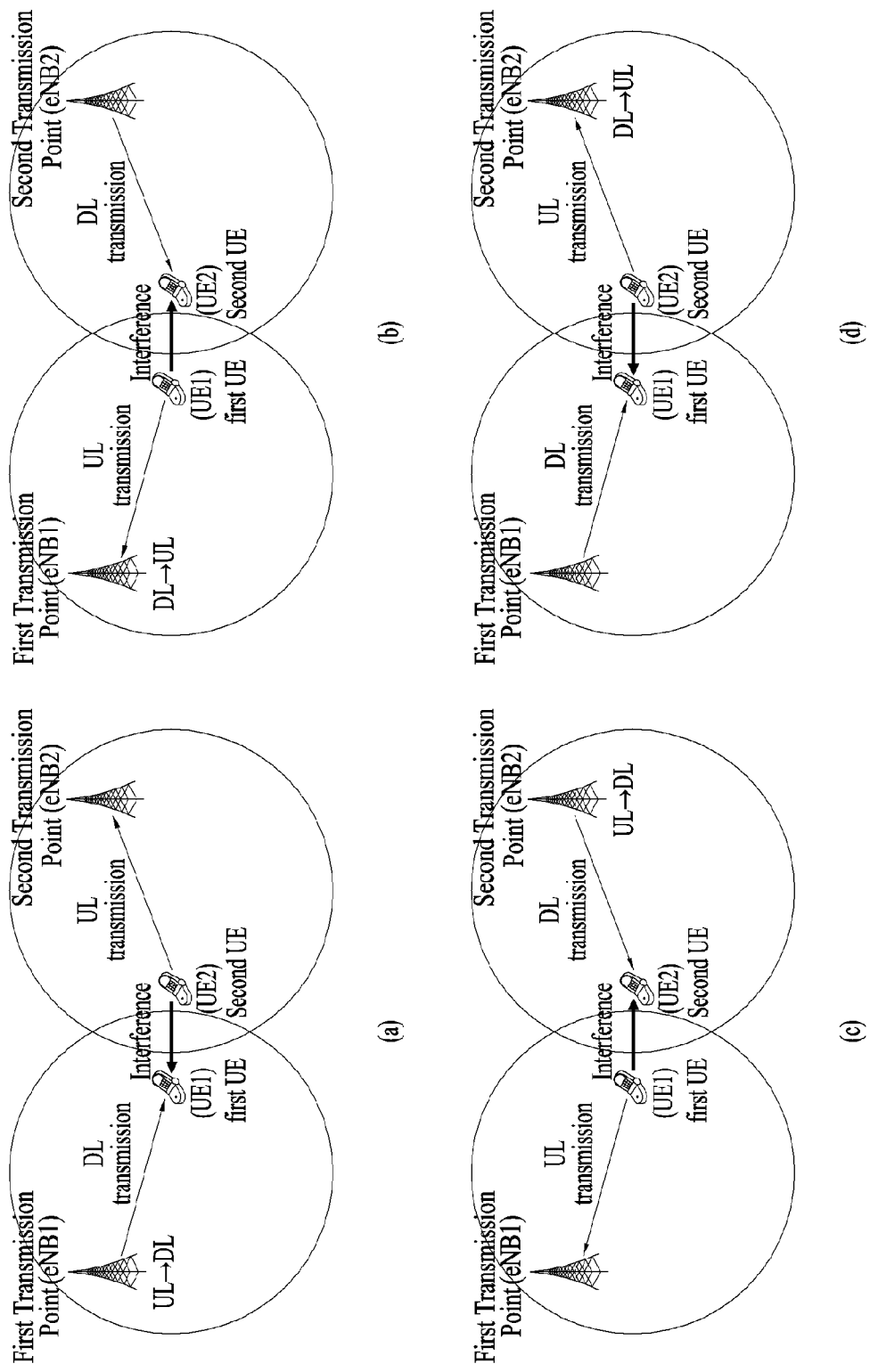
FIG. 7 is a conceptual diagram illustrating an interference environment applicable to the embodiments of the present invention.

An example of FIG. 6 is shown in FIG. 7, a TDD configuration change and a change of interference applied to the UE are shown in FIG. 7. Two neighbor TPs (eNB1, eNB2) shown in FIG. 7 may be configured to use the same TDD configuration, and the operations of FIG. 7 are based on the first UE (UE1) and the first TP (eNB1) acting as a serving cell of UE1. In FIG. 7, a thick arrow mark may represent interference caused by the change of TDD configuration.

In more detail, FIG. 7(a) shows an exemplary case in which one or more subframes configured in uplink are changed to others for downlink by the first TP (eNB 1), and FIG. 7(b) shows another case in which one or more subframes configured in downlink are changed to others for uplink by the first TP (eNB1). FIG. 7 (c) shows an exemplary case in which the second TP (eNB2) neighboring with the first TP (eNB1) changes one or more subframes configured in uplink to others for downlink. FIG. 7(d) shows another case in which the second TP (eNB2) changes one or more subframes configured in downlink to others for uplink. That is, FIGS. 7(a) and 7(b) show that TDD configuration is changed and used, and FIGS. 7(c) and 7(d) show that TDD configuration of a cell neighboring with the serving cell is changed and used.

In the above-mentioned cases, the case of FIG. 7(a) and the other case of FIG. 7(d) may affect measurement (CSI measurement, RRM measurement, etc.) of the first UE (UE1). In other words, in a first case in which a configuration of one or more subframes from among UL subframes in TDD configuration of the serving and neighbor cells is changed to DL configuration, and in a second case in which a configuration of one or more subframes from among DL subframes in TDD configuration of the serving and neighbor cells is changed to UL configuration, the first UE (UE1) of the first and second cases may be affected by other interference characteristics.

In the above-mentioned cases, for correct measurement of the first UE, a first TP acting as the serving cell may transmit the subframe set for the first UE. In this case, the subframe set and may be determined on the basis of first information and second information. Here, the first information is pattern information obtained when a UL subframe according to TDD configuration is to be used for downlink by the first TP, and the second information is pattern information obtained when a DL subframe according to TDD configuration is to be used for uplink by the second TP neighboring with the first TP. In more detail, the above-mentioned decision may be decided by a logical operation (OR) of the first information and the second information. If there are plural TPs neighboring with the first TP, the first TP may use third and fourth information, etc., and the number of information pieces may be limited to reduce complexity. If the number of information pieces is limited (under the condition that only the first and second information pieces are allowed), the first TP may select a TP configured to largely affect the first UE (UE1) on the basis of neighbor cell measurement information reported from the first UE (UE1), and may inform the first UE (UE1) of the selected TP. Alternatively, the subframe set considering the corresponding TP is configured and then notified to the first UE (UE1).

A detailed description of the above-mentioned description will hereinafter be described with reference to FIG. 8. FIG. 8(a) shows TDD configuration of the first TP (eNB1) and the second TP (eNB2). In FIG. 8(a), D is a subframe for DL transmission, U is a subframe for UL transmission, and S is a special subframe. FIG. 8(b) shows a pattern (first information) obtained when a UL subframe from among TDD configuration is to be used for downlink by the first TP (eNB1), and FIG. 8(c) shows a pattern (second information) obtained when a DL subframe from among TDD configuration is to be used for uplink by the second TP (eNB2). In FIG. 8. "0" is a subframe to be used according to TDD configuration, and "1" is a changed subframe. A logical OR operation between the first information and the second information is performed, and a subframe set for (interference) measurement may be generated as shown in FIG. 8(d). That is, if the UE having received signaling information regarding the subframe set of FIG. 8(d) measures interference of the subframe #1 and calculates an average value of the measurement values, the measurement result obtained by interference variation of the TDD configuration change can be obtained. In this case, it is preferable that the subframe set generated by the first TP (eNB1) be temporally aligned with the second information.

For measurement other than interference variation caused by TDD configuration change, the first TP (eNB1) may generate the subframe pattern of FIG. 8(e), and the subframe pattern may be transferred to the UE. In more detail, FIG. 8(e) shows a pattern of a DL subframe of an initial TDD configuration from among subframes not contained in the subframe set of FIG. 8(d). If interference of the subframe #1 contained in the subframe set is measured, the UE may measure interference/signals of the environment not affected by the TDD configuration change.

In order to generate the above-mentioned subframe set, the first TP may receive first information (having a format of the subframe set) configured for downlink from the second T point neighboring with the first TP through an X2 interface. Here, the first information may be obtained when the second TP is used for uplink in subframes configured in downlink. That is, the second TP may inform the first TP of a subframe to be used for uplink for a predetermined time from among DL subframes of the second TP through the subframe set of a predetermined time (for example, 10 ms, 20 ms, 40 ms). The first TP may also transmit information of a subframe to be used for uplink from among subframes configured in downlink by the first TP to the second TP through the X2 interface or the like.

The above-mentioned content will hereinafter be described from another standpoint. If the TP performs measurement according to the TDD configuration in case of TDD configuration of the TP, this measurement is achieved only in a subframe always defined for downlink, it can be appreciated that a UL subframe in TDD configuration can be used for measurement (i.e., a UL subframe in TDD configuration may be contained in the subframe set for measurement). In addition, subframes contained in the subframe set for the above-mentioned measurement may assume the same-characteristic interference.

Although the above-mentioned contents have been disclosed on the assumption of a TDD case, it is obvious to those skilled in the art that the above contents can be applied to the FDD case configured to use different frequency resources for UL and DL according to the same or similar logical principles. For example, in case that a frequency domain allocated for an uplink band in FDD is used for DL transmission, the TP may inform the UE of measurement/report information of the corresponding frequency domain in such a manner that the measurement/report operation is performed independently from measurement of a DL band.

Figure 9:
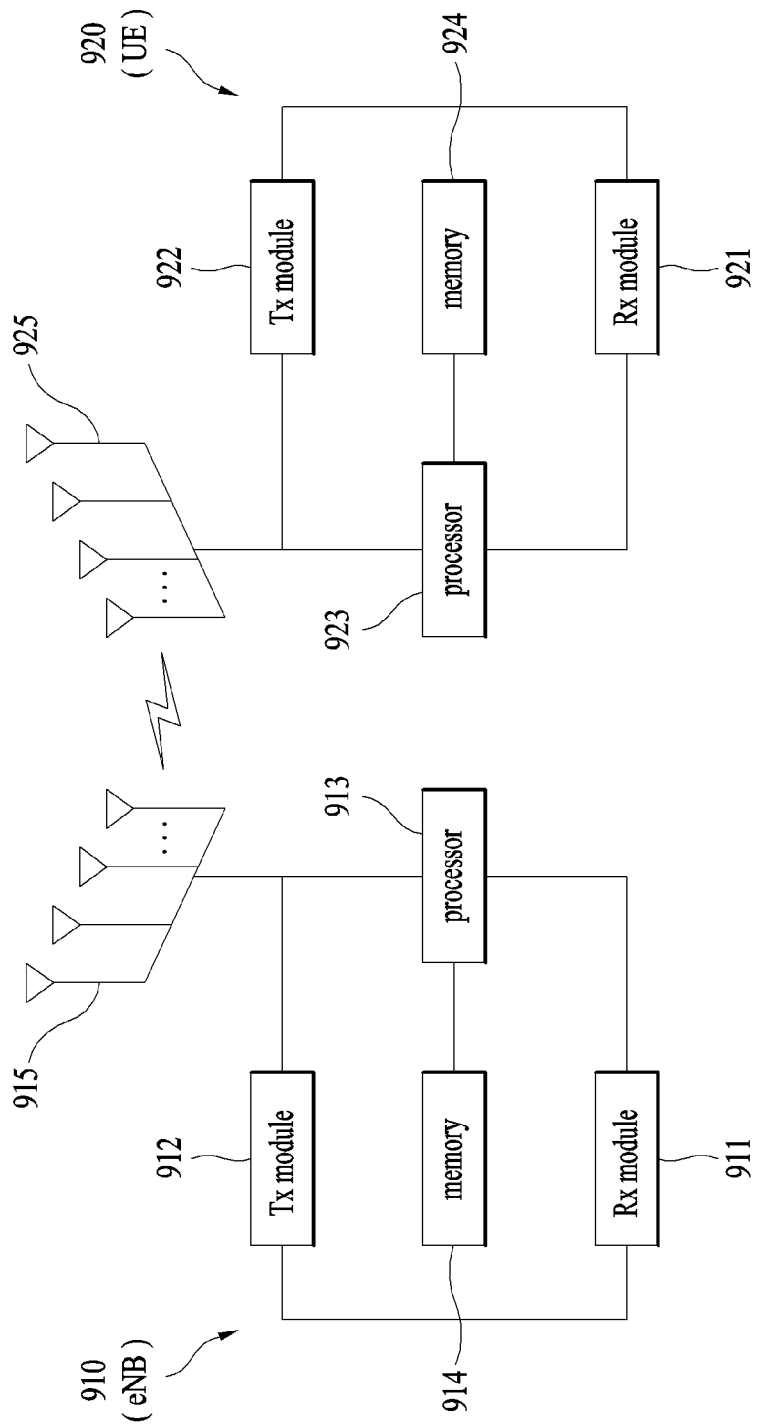
FIG. 9 is a block diagram illustrating a transceiver apparatus applicable to embodiments of the present invention.

FIG. 9 is a block diagram illustrating a TP apparatus and a UE device according to embodiments of the present invention.

Referring to FIG. 9, the TP apparatus 910 according to the present invention may include a reception (Rx) module 911, a transmission (Tx) module 912, a processor 913, a memory 914, and a plurality of antennas 915. The plurality of antennas 915 indicates a TP apparatus for supporting MIMO transmission and reception. The reception (Rx) module 911 may receive a variety of signals, data and information on an uplink starting from the UE. The Tx module 912 may transmit a variety of signals, data and information on a downlink for the UE. The processor 913 may provide overall control to the TP apparatus 910.

The processor 913 of the TP apparatus 910 according to one embodiment of the present invention can process various operations needed for the above-mentioned embodiments using a first TP device and a second TP device.

The processor 913 of the TP apparatus 910 processes information received at the TP apparatus 910 and transmission information to be transmitted externally. The memory 914 may store the processed information for a predetermined time. The memory 914 may be replaced with a component such as a buffer (not shown).

Referring to FIG. 9, the UE device 920 may include an Rx module 921, a Tx module 922, a processor 923, a memory 924, and a plurality of antennas 925. The plurality of antennas 925 indicates a UE apparatus supporting MIMO transmission and reception. The Rx module 921 may receive downlink signals, data and information from the BS (eNB). The Tx module 922 may transmit uplink signals, data and information to the BS (eNB). The processor 923 may provide overall control to the UE device 920.

The processor 923 of the UE device 920 according to one embodiment of the present invention can process various operations needed for the above-mentioned embodiments.

The processor 923 of the UE device 920 processes information received at the UE apparatus 920 and transmission information to be transmitted externally. The memory 924 may store the processed information for a predetermined time. The memory 924 may be replaced with a component such as a buffer (not shown).

The specific configurations of the TP apparatus and the UE device may be implemented such that the various embodiments of the present invention are performed independently or two or more embodiments of the present invention are performed simultaneously. Redundant matters will not be described herein for clarity.

The description of the TP apparatus 910 shown in FIG. 9 may be applied to a relay node (RN) acting as a DL transmission entity or UL reception entity without departing from the scope or spirit of the present invention. In addition, the description of the UE device 920 may be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for transmitting information of user equipment (UE) measurement by a first transmission point (TP) among a plurality of TPs configured to use a same Time Division Duplex (TDD) configuration in a wireless communication system, comprising:
   transmitting, by the first TP to a user equipment (UE), a subframe set for measurement,
   wherein the subframe set is determined based on first bitmap information and second bitmap information associated with a change of the TDD configuration,
   wherein each bit of the bitmap information indicates whether or not a first subframe configured for uplink by the TDD configuration is switched for use as a downlink by the first TP, and
   wherein each bit of the second bitmap information indicates whether or not a second subframe configured for downlink by the TDD configuration is switch for use as an uplink by a second TP that is a neighbor to the first TP.

2. The method according to claim 1, wherein the subframe set is decided by a logical OR operation between corresponding bits of the first bitmap information and the second bitmap information.

3. The method according to claim 1, wherein the subframe set is needed for the user equipment (UE) configured to measure interference caused by the change of the TDD configuration.

4. The method according to claim 1, wherein the second bitmap information is transferred from the second TP to the first TP.

5. A method for measuring at least one of a plurality of transmission points (TPs) configured to use a same Time Division Duplex (TDD) configuration in a wireless communication system, comprising:
   receiving, by a user equipment (UE) from a first TP, a subframe set for measurement; and
   performing, by the UE, measurement in at least one subframe corresponding to the subframe set,
   wherein the subframe set is determined based on first bitmap information and second bitmap information associated with a change of the TDD configuration, wherein each bit of the first bitmap information indicates whether or not a first subframe configured for uplink by the TDD configuration is switched for use as a downlink by the first TP, and wherein each bit of the second bitmap information indicates whether or not a second subframe configured for downlink by the TDD configuration is switched for use as an uplink by a second TP that is a neighbor to the first TP.

6. The method according to claim 5, wherein the subframe set is decided by a logical OR operation between corresponding bits of the first bitmap information and the second bitmap information.

7. The method according to claim 5, wherein:
the subframe set is configured to measure interference caused by the change of the TDD configuration, and
the measurement step further includes averaging interference measured in the at least one subframe.

8. The method according to claim 5, wherein the second information is transferred from the second TP to the first TP.

9. A first transmission point (TP) apparatus for transmitting information of user equipment (UE) measurement among TPs configured to use a same Time Division Duplex (TDD) configuration in a wireless communication system, comprising:
a transmission (Tx) module; and
a processor,
wherein the processor controls the Tx module to transmit a subframe set for measurement to a user equipment (UE),
wherein the subframe set is determined based on first bitmap information and second bitmap information associated with a change of the TDD configuration,
wherein each of the first bitmap information indicates whether or not a first subframe configured for uplink by the TDD configuration is switched for use as a downlink by the first TP, and
wherein each bit of the second bitmap information indicates whether or not a second subframe configured for downlink by the TDD configuration is switched for use as an uplink by a second TP that is a neighbor to the first TP.

10. A user equipment (UE) apparatus for measuring at least one of a plurality of transmission points (TPs) configured to use a same Time Division Duplex (TDD) configuration in a wireless communication system, comprising:
a reception (Rx) module; and
a processor,
wherein the processor controls the Rx module to receive a subframe set for measurement from a first TP, and performs measurement in at least one subframe corresponding to the subframe set,
wherein the subframe set is determined based on first bitmap information and second bitmap information associated with a change of the TDD configuration,
wherein each of the first bitmap information indicates whether or not a first subframe configured for uplink by the TDD configuration is switched for use as a downlink by the first TP, and
wherein each bit of the second bitmap information indicates whether or not a second subframe configured for downlink by the TDD configuration is switched for use as an uplink by a second TP that is a neighbor to the first TP.

* * * * *